United States Patent
Cunningham et al.

(10) Patent No.: US 11,187,661 B2
(45) Date of Patent: Nov. 30, 2021

(54) DETECTING BLACK POWDER LEVELS IN FLOW-LINES

(71) Applicant: Saudi Arabian Oil Company, Dhahran (SA)

(72) Inventors: Vincent Cunningham, Ferbane (IE); Ezzat Hegazi, Windsor (CA); Turki Alomairi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 50 days.

(21) Appl. No.: 15/642,039

(22) Filed: Jul. 5, 2017

(65) Prior Publication Data

US 2019/0011372 A1     Jan. 10, 2019

(51) Int. Cl.
| | | |
|---|---|---|
| *G01N 21/85* | (2006.01) | |
| *G01N 21/53* | (2006.01) | |
| *G01N 21/47* | (2006.01) | |
| *G01N 15/06* | (2006.01) | |
| G01N 15/00 | (2006.01) | |

(52) U.S. Cl.
CPC .......... *G01N 21/85* (2013.01); *G01N 15/06* (2013.01); *G01N 21/4785* (2013.01); *G01N 21/532* (2013.01); *G01N 2015/0053* (2013.01); *G01N 2015/0693* (2013.01)

(58) Field of Classification Search
CPC .... G01N 21/85; G01N 15/06; G01N 21/4785; G01N 21/532; G01N 2015/0053; G01N 2015/0693
See application file for complete search history.

(56) References Cited

U.S. PATENT DOCUMENTS

| | | |
|---|---|---|
| 3,586,862 A | 6/1971 | Topol |
| 3,790,279 A | 2/1974 | Skala |

(Continued)

FOREIGN PATENT DOCUMENTS

| | | |
|---|---|---|
| WO | 1991000933 | 1/1991 |
| WO | 1991000933 A1 | 1/1991 |

OTHER PUBLICATIONS

Edmund Optics, "Understanding Staptial Filters," Retrieved from the Internet: URL: https://web.archive.org/web/20161203155646/http://www.edmundoptics.com:80/resources/application-notes/lasers/understanding-spatial-filters/ [retrieved on Sep. 10, 2018], Dec. 3, 2016, 3 pages.

(Continued)

*Primary Examiner* — Georgia Y Epps
*Assistant Examiner* — Don J Williams
(74) *Attorney, Agent, or Firm* — Fish & Richardson P.C.

(57) ABSTRACT

An optical signal source is positioned at a first side of the flow cell or the flow-line bypass. The optical signal source is capable of emitting an optical signal through the first side of the flow cell or the flow-line bypass. A first optical detector is positioned at a second side of the flow cell. The second side is opposite the first side. The first optical detector is capable of detecting a transmitted-light intensity of the optical signal transmitted through the second side of the flow cell or the flow-line bypass. A second optical detector is positioned at a third side of the flow cell. The third side is different than the first side and the second side. The second optical detector is capable of detecting a scattered-light intensity of a scattered optical signal transmitted through the third side of the flow cell or the flow-line bypass.

27 Claims, 3 Drawing Sheets

(56) References Cited

U.S. PATENT DOCUMENTS

| | | | |
|---|---|---|---|
| 3,876,307 A | 4/1975 | Skala | |
| 3,892,485 A | 7/1975 | Merritt et al. | |
| 3,915,570 A | 10/1975 | Skala | |
| 3,936,192 A | 2/1976 | Skala | |
| 4,013,953 A | 3/1977 | Skala | |
| 4,365,896 A | 12/1982 | Mihalow | |
| 4,728,190 A | 3/1988 | Knollenberg | |
| 4,871,251 A | 10/1989 | Preikschat et al. | |
| 4,900,152 A * | 2/1990 | Wiegleb | G01N 21/85 250/576 |
| 5,012,119 A | 4/1991 | Rhiner | |
| 5,033,851 A | 7/1991 | Sommer | |
| 5,245,200 A | 9/1993 | Fladda | |
| 5,331,177 A * | 7/1994 | Kubisiak | A47L 15/4297 250/574 |
| 5,467,188 A | 11/1995 | Miyashita | |
| 5,671,046 A | 9/1997 | Knowlton | |
| 6,519,034 B1 | 2/2003 | Engler et al. | |
| 7,209,231 B2 | 4/2007 | Rastopov | |
| 7,339,657 B2 | 4/2008 | Coates | |
| 7,369,243 B2 | 5/2008 | Sakaino | |
| 8,285,491 B2 | 10/2012 | Xie et al. | |
| 8,958,067 B2 | 2/2015 | Shimmura et al. | |
| 2007/0175269 A1 | 8/2007 | Sprenger et al. | |
| 2008/0002200 A1* | 1/2008 | White | G01N 21/51 356/339 |
| 2012/0281203 A1 | 11/2012 | Hermansen | |
| 2016/0258877 A1 | 9/2016 | Al Hosani et al. | |

OTHER PUBLICATIONS

International Search Report and Written Opinion issued in International Application No. PCT/US2018/038780 on Oct. 2, 2018, 19 pages.

GCC Examination Report in GCC Appln. No. GC 2018-35581, dated Jan. 15, 2020, 4 pages.

* cited by examiner

ABSTRACT# DETECTING BLACK POWDER LEVELS IN FLOW-LINES

TECHNOLOGY FIELD

This disclosure relates to pipeline and flow-line monitoring.

BACKGROUND

When transporting natural gas liquids through a pipeline, black powder can form and accumulate. The black powder can be formed from a mixture of iron oxides, iron sulfides, or any other chemical. Black powder formation can accelerate during production up-sets or pipeline maintenance.

SUMMARY

This disclosure describes technologies relating to detecting black powder in flowlines.

An example implementation of the subject matter described within this disclosure is a black powder detector with the following features. A flow cell or a flow-line bypass that attaches to a flow-line. The flow cell or the flow-line bypass includes a flow inlet and a flow outlet. An optical signal source is positioned at a first side of the flow cell or the flow-line bypass. The optical signal source is capable of emitting an optical signal through the first side of the flow cell or the flow-line bypass. A first optical detector is positioned at a second side of the flow cell. The second side is opposite the first side. The first optical detector is capable of detecting a transmitted-light intensity of the optical signal transmitted through the second side of the flow cell or the flow-line bypass. A second optical detector is positioned at a third side of the flow cell. The third side is different than the first side and the second side. The second optical detector is capable of detecting a scattered-light intensity of a scattered optical signal transmitted through the third side of the flow cell or the flow-line bypass.

Aspects of the example implementation, which can be combined with the example implementation alone or in combination, include the following. The flow cell includes a lens positioned between the third side and the second optical detector that is capable of focusing the scattered optical signal on the second optical detector. A pinhole is positioned between the second side and the first optical detector and is capable of filtering forward scattered light below a predefined threshold.

Aspects of the example implementation, which can be combined with the example implementation alone or in combination, include the following. The second optical detector detects the optical signal scattered at an angle relative to an axis perpendicular to a transmit axis along a signal path of the optical signal and in a range between 30° to −30° relative to a perpendicular axis.

Aspects of the example implementation, which can be combined with the example implementation alone or in combination, include the following. The optical signal source includes a collimated optical signal source or a non-coherent signal source.

Aspects of the example implementation, which can be combined with the example implementation alone or in combination, include the following. The optical signal source emits a continuous optical signal.

Aspects of the example implementation, which can be combined with the example implementation alone or in combination, include the following. The optical signal comprises a visible wavelength of light.

Aspects of the example implementation, which can be combined with the example implementation alone or in combination, include the following. One or more processors are configured to determine whether changes in black-powder concentration occur based on changes the transmitted light intensity. The processors are also configured to determine whether the changes are accurate based on comparing the changes in the transmitted-light intensity to changes in the scattered-light intensity.

Aspects of the example implementation, which can be combined with the example implementation alone or in combination, include the following. Determining whether changes are accurate includes determining the transmitted-light intensity and the scattered-light intensity as a function of time and comparing changes in the transmitted-light intensity in a time period with changes in the scattered-light intensity in the time period.

Aspects of the example implementation, which can be combined with the example implementation alone or in combination, include the following. Determining whether the changes are accurate includes determining the changes in the transmitted-light intensity and the scattered-light intensity both increase or decrease, and, in response to the changes both increasing or decreasing, determining if the changes in the black powder concentration is a false positive.

An example implementation of the subject matter described within this disclosure is a method with e following features. A liquid flow is flowed through a flow-line. A portion of the flow is flowed through a flow cell fluidically connected to the flow-line. An optical signal is sent from an optical signal source into the flow cell. The optical signal is detected with a first detector positioned at an opposite end of the optical signal source. A scattered optical signal is detected with a second detector positioned at an angle to the first detector. A first attenuation of the optical signal detected by the first detector and a second attenuation of the scattered optical signal detected by the second detector are determined. A contamination level is determined based on the determined attenuation of the first optical signal and the scattered optical signal.

Aspects of the example method, which can be combined with the example method alone or in combination, include the following. An increase in the attenuation of the optical signal and a decrease of an attenuation in the scattered optical signal indicate an increase in contamination.

Aspects of the example method, which can be combined with the example method alone or in combination, include the following. An increase in the first attenuation of the optical signal and an increase in the second attenuation of the scattered optical signal indicate a false reading.

Aspects of the example method, which can be combined with the example method alone or in combination, include the following. The liquid flow comprises a natural gas liquid.

Aspects of the example method, which can be combined with the example method alone or in combination, include the following. Sending an optical signal includes sending a continuous optical signal.

Aspects of the example method, which can be combined with the example method alone or in combination, include the following. Detecting the optical signal and the scattered optical signal comprises averaging the detected signals over a specified period of time.

Aspects of the example method, which can be combined with the example method alone or in combination, include the following. The specified period of time is greater than four seconds.

Aspects of the example method, which can be combined with the example method alone or in combination, include the following. The optical signal includes a visible wavelength of light.

Aspects of the example method, which can be combined with the example method alone or in combination, include the following. The angle of the second detector is substantially 90° from the first detector.

Aspects of the example method, which can be combined with the example method alone or in combination, include the following. The optical signal source includes a laser and the optical signal includes a laser beam.

Aspects of the example method, which can be combined with the example method alone or in combination, include the following. The fluid is directed to a filtering system in response to determining the contamination level exceeds a pre-determined threshold.

An example implementation of the subject matter described within this disclosure is a black powder detector system with the following features. A flow cell is attached to a flow-line. The flow cell includes a flow inlet fluidically connecting the flow cell to the flow-line and a flow outlet fluidically connecting the flow cell to the flow-line. An optical signal source is positioned at a first side of the flow cell. The optical signal source is capable of emitting an optical signal into the flow cell. A first optical detector is positioned at a second side of the flow cell opposite of the first side. The optical detector is capable of detecting an intensity of the optical signal. A second optical detector is positioned at a third side of the flow cell perpendicular to the first side and the second side. The second optical detector is capable of detecting a scatter intensity of the optical signal. A first optical conditioning mechanism connects the flow cell to the first detector. A second optical conditioning mechanism connects the flow cell to the second detector.

Aspects of the example system, which can be combined with the example system alone or in combination, include the following. A fluid in the flow-line includes natural gas liquids.

Aspects of the example system, which can be combined with the example system alone or in combination, include the following. The optical signal source includes a collimated laser emitting laser beam with a frequency in a range from 400 nm to 600 nm.

Aspects of the example system, which can be combined with the example system alone or in combination, include the following. The black powder detector includes one or more processors configured to determine whether changes to black-powder concentration based on changes to a transmitted light intensity and to determine whether the changes are accurate based on comparing the changes in the transmitted-light intensity to changes in a scattered-light intensity.

Aspects of the example system, which can be combined with the example system alone or in combination, include the following. Determining whether changes are accurate includes determining the transmitted-light intensity and the scattered-light intensity as a function of time, and comparing changes in the transmitted-light intensity in a time period with changes in the scattered-light intensity in the time period.

Aspects of the example system, which can be combined with the example system alone or in combination, include the following. Determining whether the changes are accurate includes determining the changes in the transmitted-light intensity and the scattered-light intensity both increase or decrease, and, in response to the changes both increasing or decreasing, determining the changes in the black-powder concentration is a false positive.

Particular implementations of the subject matter described in this specification can be implemented so as to realize one or more of the following advantages. Optically measuring black powder levels prevents issue inherent with traditional probes, such as traditional probes becoming dirty.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Black powder can cause a range of problems, including product contamination, equipment contamination, erosion wear in compressors, instrument and filter clogging, erosion and sealing problems for valves, and flow reduction. Tracking the particle concentration within a flow-line can assist in maintenance planning for the entire system to reduce these risks.

This disclosure relates to a method and apparatus for monitoring contamination in flow-lines or pipelines. In this apparatus, a flow cell pulls a side-stream from the main flow-line into a flow cell for measurement. The flow cell has an optical source, for example, a laser or other optical source, attached to one side. On the opposite side is a first optical detector. A second optical detector is located at an angle to the beam path, for example, perpendicular to the beam path. The optical source emits a beam directed toward the first optical detector. The first optical detector measures the attenuation of the beam due to the particles in the fluid. The second optical detector detects the scattering of the beam caused by the particles in the fluid. The signal from both detectors is sent to one or more processors to determine the particle concentration in the pipeline.

Figure 1:
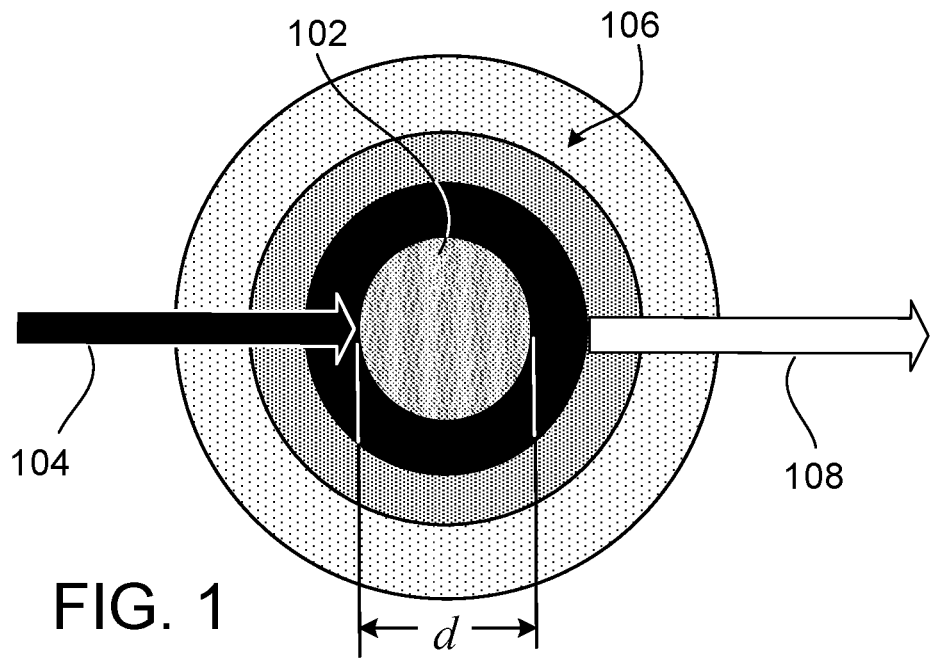
FIG. 1 is a schematic diagram of a black powder particle interacting with an optical signal.

FIG. 1 illustrates attenuation and scattering of a beam of incident light 104 during propagation through a fluid or vacuum that includes black-powder particles 102. As the beam of incident light 104 propagates the fluid with the black-powder particles, a portion of the beam 104 is scattered off the black-powder particles to produce scattered light 106. A remaining portion of the beam 104 exiting the fluid along the axis of propagation is attenuated light 108. The beam 104 may be attenuated through scattering, absorption, or other processes. In some instances, an intensity of the scattered light 106 and an intensity of the attenuated light 108 are a function of a density of black-powdered particles in the fluid 102. For example, the intensity of the scattered light 106 may increase while the intensity of the attenuated light 108 may decrease as the particle concentration of the black-powdered particles increases in the fluid. As the particle concentration decreases, the intensity of the scattered light 106 can decrease, while the intensity of the attenuated light 108 can increase.

Figure 2:
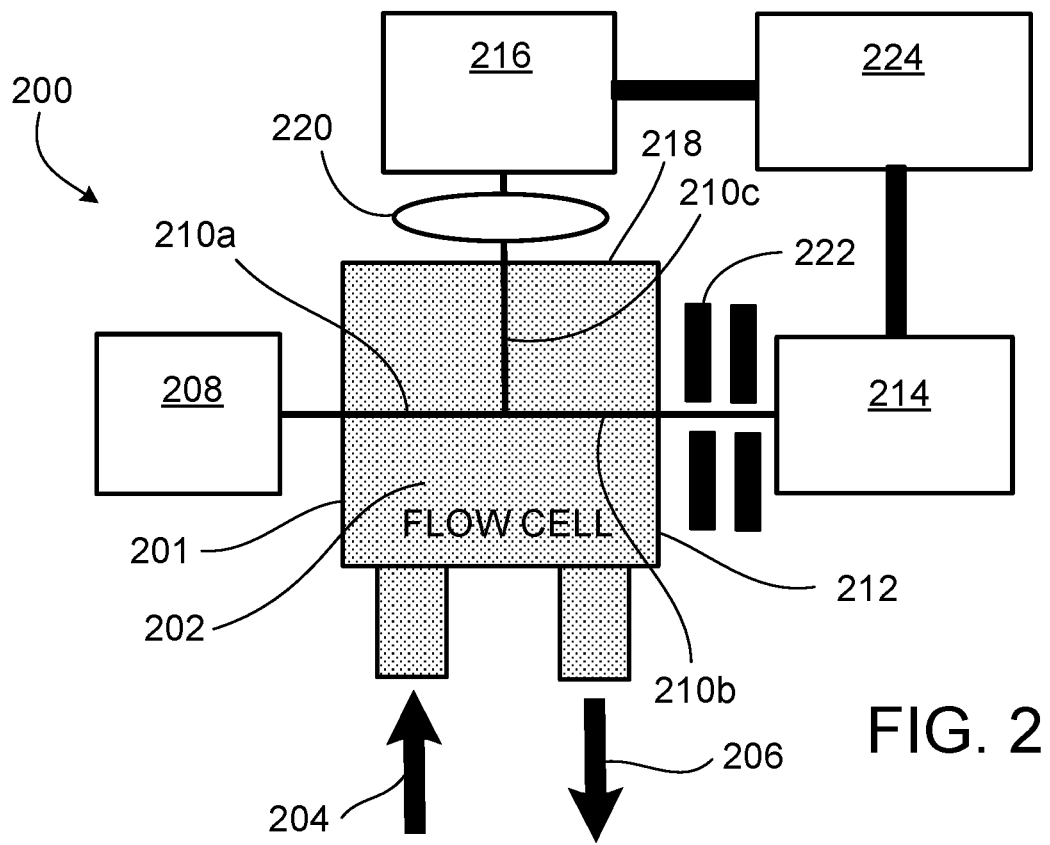
FIG. 2 is a schematic diagram of a black powder detector.

FIG. 2 illustrates an example black powder detector 200 for determining a particle concentration in a black powder mitigation system. For example, [give the ideal example of what you are trying to accomplish. At a high level, the black-powder detector 200 includes a flow cell 202 defining a volume configured to contain fluid, such as liquefied natural gas or water, with black-powder particles, an optical source 208 configured to emit an optical signal, a first detector 214 oriented on a propagation axis of the optical signal and configured to detect an intensity of an attenuation signal, and a second detector 216 oriented at an angle, for example, perpendicular, to the propagation axis and configured to detect an intensity of a scattered signal. The particle concentration of the black-powder particles in the fluid can be determined based on the intensity of the attenuation signal and the intensity of the scattered signal. In some implementations, other particulates can be detected, such as sand. The black powder detector 200 can be used in many different flow systems, such as pipelines.

The black powder detector 200 can include a flow cell 202 or a similar flow-line bypass that can attach and fluidically connect to a flow-line or pipeline. The flow cell 202 can include multiple sides that define a volume capable of containing a sample. For example, the flow cell 202 can be a cube, a rectangular prism, a triangular prism, a cone, a cylinder, or other polyhedrons. In some implementations, the flow cell 202 can be a sphere or spheroidal without departing from the scope of the disclosure. For example, the flow cell 202 can have six sides that define a volume capable of containing a portion of a flow. The sides of the flow cell 202 may be flat, curved, or have other shapes including irregular shapes without departing from the scope of the disclosure. The illustrated flow cell 202 is a rectangular prism with a first side 201 and a second side 212 that is parallel and directly across from the first side 201. The flow cell 202 also includes a third side 218 that is perpendicular and connected to both the first side 201 and the second side 212. In addition, the flow cell 202 includes a fourth side that is directly across and parallel to the third side 218. In some implementations, a diameter of the flow cell 202 can be approximately one fourth of that of the flow-line or pipeline that the flow cell 202 is measuring. The flow cell 202 is at least partially constructed with a transparent, optical grade material, such as quartz or glass. The flow cell 202, as illustrated, includes a flow inlet 204 and a flow outlet 206 located on the fourth side of the flow cell 202. The flow inlet 204 and the flow outlet 206 can include one or more pipes that define flow channels for fluid ingress and egress. While pipes are shown in the example implementation, any other flow-channel mechanism can be used without departing from the scope of the disclosure. While the illustrated implementation shows both the flow inlet 204 and the flow outlet 206 on the same side of the flow cell 202, the flow inlet 204 and the flow outlet 206 can be on different sides of the float cell without departing from the scope of the disclosure.

On a first side 201 of the flow cell 202, an optical signal source 208 is positioned. On a second side 212 of the flow cell 202 that is opposite of the first side 201 of the flow cell 202, is a first optical detector 214. A second optical detector 216 is positioned at a third side 218 of the flow cell 202. The third side 218 is different than the first side 201 and the second side 212. The optical signal source 208 is positioned on a first side of the flow cell 202 and can emit an optical signal 210a through the first side 201 into the flow cell 202. In some implementations, the optical signal source 208 can include a collimated optical signal source or a non-coherent signal source. For example, a laser or light emitting diode (LED) can be used to emit a light signal at a visible wavelength such as 400 nm to 600 nm. In some implementations, the optical source 208 can have a power output between 20 milliwatts and 500 milliwatts. The optical signal 210a can have a diameter between 0.5 centimeters to 5 centimeters. In some implementations, the optical signal source 208 emits a continuous optical signal 210a. In some implementations, the optical signal source 208 emits a pulsed optical signal 210a. In response to samples in the flow cell 202, the optical signal 210 forms a transmitted light 210 that exits a second side of the flow cell 202 and a scattered optical signal 210c that exits a third side 218 of the flow cell.

The first optical detector 214 is positioned on the second side of the flow cell and can detect an intensity of the transmitted light 210b exiting the second side 212 of the flow cell 202. The second optical detector 216 is positioned on the third side of the flow cell and can detect an intensity of the scattered optical signal 210c exiting through the third side 218 of the flow cell 202. In some implementations, a charge coupled device (CCD) is used for the first optical detector 214, the second optical detector 216, or both. Other detectors, such as photodetectors, photomultipliers, and any other light detection mechanism can be used.

In some implementations, either the first optical detector 214 or the second detector 216 can include an optical conditioning device, such as a lens 220 or a pinhole 222. In the illustrated example, a lens 220 is positioned between the third side 218 of the flow cell 202 and the second optical detector 216. The lens 220 can focus the scattered optical signal 210c on the second optical detector 216. For example, a convex lens with a large diameter and a focal length slightly longer than a perpendicular length across the flow-cell relative to the second detector 216 can be used. The focal length of the lens can affect the optimal distance that the second optical detector 216 is positioned from the signal path of the optical signal 210a. A pinhole 222 can be positioned between the second side 212 of the flow cell 202 and the first optical detector 214. The pinhole 222 can filter forward transmitted light 210b. For example, the pinhole can have a diameter of approximately one millimeter. While the lens 220 is used for the second detector 216 and a pinhole 222 is used for the first optical detector 214 in the illustrated implementation, either the lens 220, the pinhole 222, or any other optical conditioning device can be used alone or in combination for either the first optical detector 214 or the second optical detector 216.

In some implementations, the second optical detector 216 detects the scattered optical signal 210c at an angle relative to a signal path of the optical signal 210a. For example, the second optical detector can detect the optical signal 210c at an angle between 60° and 120° from the signal path. In other words, the second detector can detect the optical signal 210c at an angle in a range between 30° to −30° relative to an axis perpendicular to the signal path. That is, the second optical detector 216 detects a scattered optical signal from a position between that is 90°±30° from the path of the initial optical signal 210a. While the illustrated implementation shows the second detector 216 positioned approximately half-way across the beam path, the second detector 216 can be positioned anywhere along the beam path. The second detector can be positioned a wide range of distances from the signal path of the optical signal 210a.

The black powder detector 200 can also include a data system 224 configured to process information identifying intensities of the transmitted-light 210b and the scattered-light 210c. For example, the data system 224 can determine whether there are changes in black powder concentration based on changes the intensity of transmitted-light 210b. In such an example, the data system 224 can be used to determine whether the changes are accurate based on comparing the changes in the transmitted-light intensity 210b to changes in the scattered-light intensity 210c. Determining whether changes are accurate can involve measuring the intensities of the transmitted-light 210b and the scattered-light 210c as a function of time and comparing changes in the transmitted-light 210b intensity in a time period with changes in the scattered-light 210c intensity in that time period. Determining whether the changes are accurate can include determining that the changes in the transmitted-light 210b intensity and the scattered-light 210c intensity both increase or decrease. If the changes to light intensities are both increasing or decreasing, then the determined changes in the black powder concentration can be considered a false positive. Determining a concentration level can involve using any known equation for determining concentration levels based on optical transmission of light through a fluid, such as the Beer-Lambert Law. In some implementations, the black powder detector can be calibrated prior to or during installation.

If there is an increase in the attenuation of the optical signal and a decrease of an attenuation in the scattered optical signal, then that can indicate an increase in contamination. If there is an increase in the first attenuation of the optical signal and an increase in the second attenuation of the scattered optical signal, then that can indicate a false reading. In some implementations, detecting the optical signal and the scattered optical signal can include averaging the detected signals over a specified period of time, for example, a period of time greater than four seconds. If there is a decrease in the attenuation of the optical signal and an increase of an attenuation in the scattered optical signal, then that can indicate a decrease in contamination. If there is a decrease in the first attenuation of the optical signal and a decrease in the second attenuation of the scattered optical signal, then that can indicate a false reading.

In some aspects of operation, fluid from a pipeline or any other flow-line can enter the flow cell 201 through the flow inlet 204. The optical source 208 transmits an optical signal 210a through the fluid within the float cell 202. A portion of the signal is attenuated by black-powder or other particulate within the fluid, and an attenuated signal 210b is detected by the first optical detector 214. Simultaneously, a portion of the optical signal 210a is scattered and the scattered signal 210c is detected by the second detector 216. The data system 224 compares the two detected signals, provided by the first detector 214 and the second detector 216, over time. Based on the comparison of the two signals, a concentration of black powder within the fluid can be determined. As previously described, the black powder detector can perform self-diagnostics to identify false readings.

Figure 3:
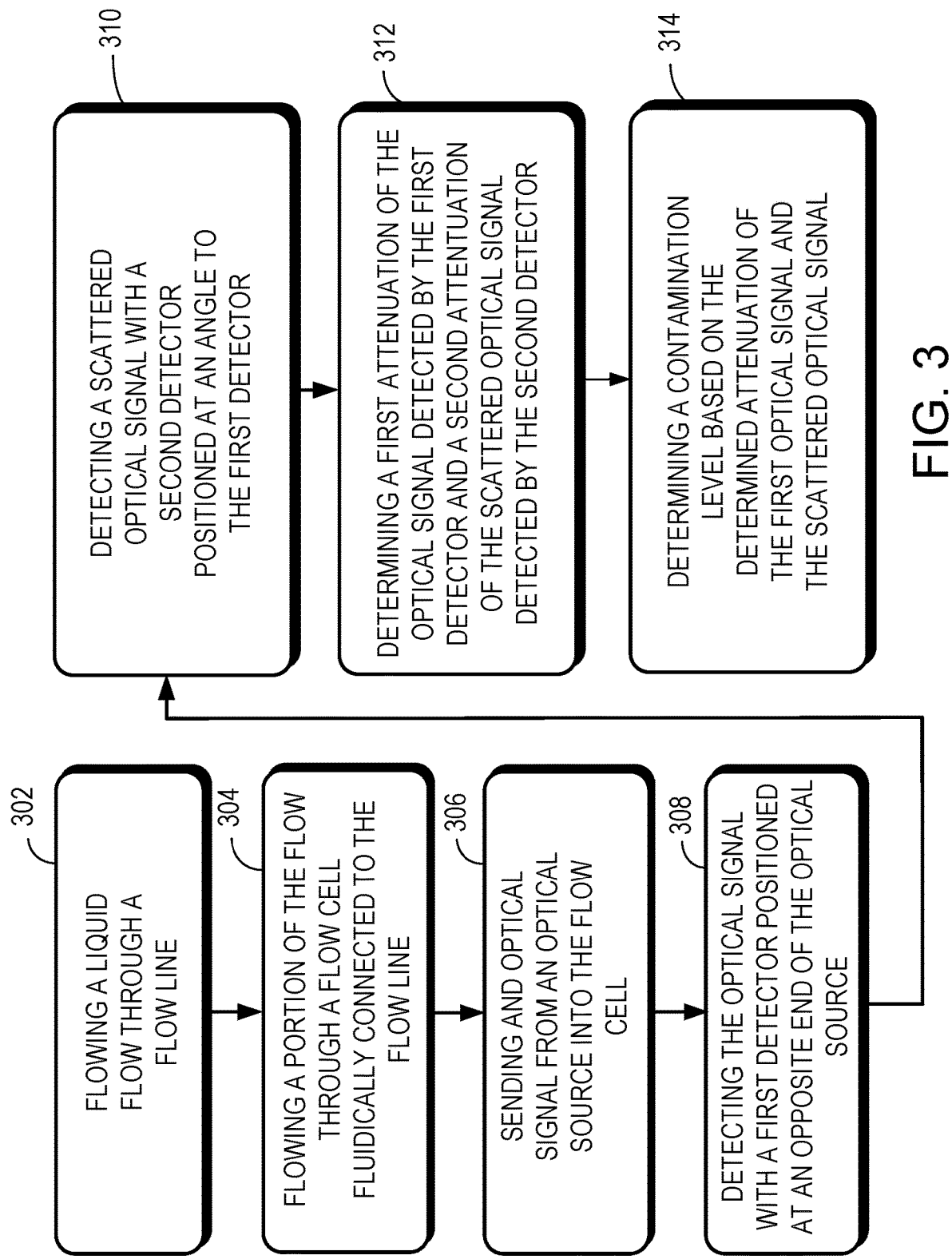
FIG. 3 is a flowchart of an example method for detecting black powder levels.

FIG. 3 is a flowchart showing an example method 300 that can be used to detect black powder in a pipeline, flow-line, or any other flow path. At 302, a liquid flow is flowed through a flow-line. In some implementations, the liquid can include a natural gas liquid. At 304, a portion of the flow is flowed through the flow cell 202 that is fluidically coupled to the flow-line. For example, the flow inlet 204 and flow outlet 206 illustrated in FIG. 2 can be directly connected to the flow line. At 306, an optical signal 210a is transmitted into the flow cell 202. For example, the optical signal 210a can be transmitted from the optical signal source 208 as illustrated in FIG. 2. At 308, the transmitted-light 210b is detected. For example, the transmitted light can be detected with the first optical detector 214 positioned at an opposite end of the optical signal source 208 as illustrated in FIG. 2. At 310, a scattered optical signal 210c is detected with a second optical detector 216 positioned at an angle to the first detector. In some implementations, the second source can be positioned at 90° from a path of the optical signal 210a. At 312, a first attenuation of the transmitted-light 210b detected by the first optical detector 214 and a second attenuation of the scattered optical signal 210c detected by the second optical detector 216 are determined. At 314, a contamination level is determined based on the determined attenuation of the first optical signal 210a and the scattered optical signal 210c. In one example, there is an increase in the attenuation of the optical signal and a decrease of an attenuation in the scattered optical signal. In such an example, there can be an increase in contamination.

When the level of black powder crosses a pre-set threshold, then the fluid can be diverted to a filtering system to remove the black powder. The pre-set threshold is set by the desired quality of the fluid.

Figure 4:
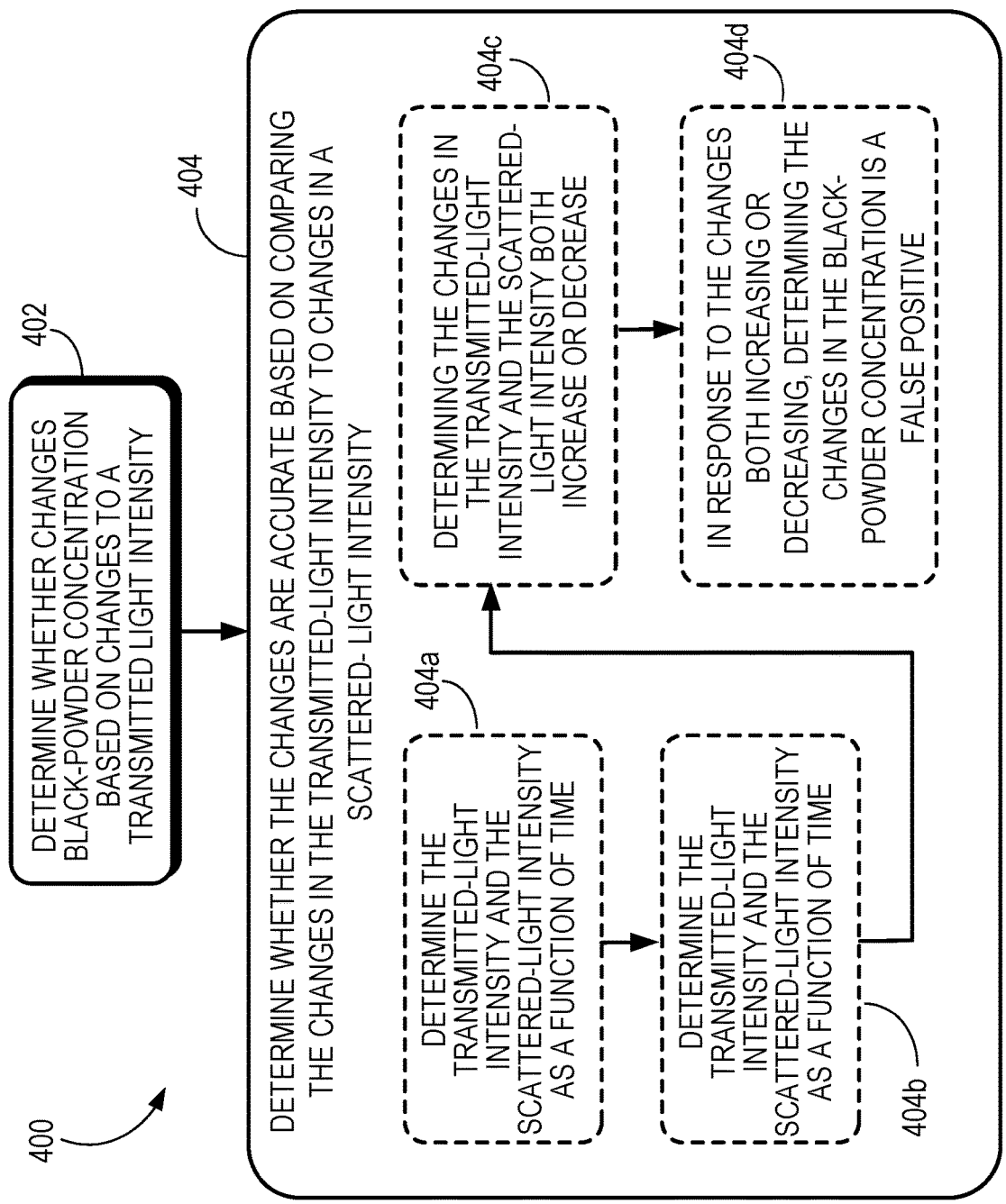
FIG. 4 is a flowchart of an example method for analyzing data from a black powder detector.

FIG. 4 is a flowchart of an example method 400 that can be used by the data system 224 data system 224 data system 224 data system 224 to analyze the signals from the first optical detector 214 and the second optical detector 216 to determine an accuracy of the black powder detector 200. At 402, changes to the black powder concentration is determined based on changes to a transmitted light intensity. At 404, an accuracy of the determined changes is determined based on comparing the changes in the transmitted-light intensity to changes in a scattered-light intensity. At 404a, the transmitted-light intensity and the scattered-light intensity are determined as a function of time. At 404b, changes in the transmitted-light intensity in a time period are compared with changes in the scattered-light intensity in the time period. At 404c, the changes in the transmitted-light intensity and the scattered-light intensity are determined to either both increase or decrease. At 404d, in response to the changes both increasing or decreasing, the changes in the black-powder concentration is determined to be a false positive.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A black powder detector comprising:
   a flow cell configured to attach to a flow-line and to receive a side-stream from the flow-line for analysis, the flow cell comprising a flow inlet defining a first flow passage from the flow-line and a flow outlet defining a second flow passage into the flow-line, the flow cell being separate from the flow-line;
   an optical signal source positioned at a first side of the flow, the optical signal source configured to emit an optical signal through the first side of the flow cell;
   a first optical detector positioned at a second side of the flow cell, the second side opposite the first side, and the first optical detector configured to detect a transmitted-light intensity of the optical signal transmitted through the second side of the flow cell;
   a second optical detector positioned at a third side of the flow cell, the third side different than the first side and the second side, the second optical detector configured to detect a scattered-light intensity of a scattered optical signal transmitted through the third side of the flow cell;
   a lens positioned between the third side and the second optical detector and configured to focus the scattered optical signal on the second optical detector; and
   a pinhole positioned between the second side and the first optical detector and configured to filter forward scattered light below a predefined threshold.

2. The black powder detector of claim 1, wherein the second optical detector detects the optical signal scattered at an angle relative to an axis perpendicular to a transmit axis along a signal path of the optical signal and in a range between 30° to −30° relative to a perpendicular axis.

3. The black powder detector of claim 1 wherein the optical signal source comprises a collimated optical signal source or a non-coherent signal source.

4. The black powder detector of claim 1, wherein the optical signal source emits a continuous optical signal.

5. The black powder detector of claim 1, wherein the optical signal comprises a visible wavelength of light.

6. The black powder detector of claim 1, further comprising one or more processors configured to:
   determine whether changes in black-powder concentration occur based on changes the transmitted-light intensity; and
   determine whether the changes are accurate based on comparing the changes in the transmitted-light intensity to changes in the scattered-light intensity.

7. The black powder detector of claim 6, wherein determining whether changes are accurate comprises:

determining the transmitted-light intensity and the scattered-light intensity as a function of time; and
comparing changes in the transmitted-light intensity in a time period with changes in the scattered-light intensity in the time period.

8. The black powder detector of claim 6, wherein determining whether the changes are accurate comprises:
   determining the changes in the transmitted-light intensity and the scattered-light intensity both increase or decrease; and
   in response to the changes both increasing or decreasing, determining if the changes in the black-powder concentration is a false positive.

9. The black powder detector of claim 1, wherein the flow inlet and the flow outlet are on the same side of the flow cell.

10. The black powder detector of claim 1, wherein the pinhole has a diameter of substantially one millimeter.

11. A method comprising:
   flowing a liquid flow through a flow-line;
   flowing a side-stream of the flow from the flow-line, through a flow cell fluidically connected to the flow-line, and back to the flow-line, the flow cell being separate from the flow-line;
   sending an optical signal from an optical signal source into the flow cell;
   detecting the optical signal with a first detector positioned at an opposite end of the optical signal source, the optical signal being conditioned by a pinhole;
   detecting a scattered optical signal with a second detector positioned at an angle to the first detector, the scattered optical signal being conditioned by a lens;
   determining a first attenuation of the optical signal detected by the first detector and a second attenuation of the scattered optical signal detected by the second detector; and
   determining a contamination level based on the determined attenuation of the optical signal and the scattered optical signal.

12. The method of claim 11, wherein an increase in the attenuation of the optical signal and a decrease of an attenuation in the scattered optical signal indicate an increase in contamination.

13. The method of claim 11, wherein an increase in the first attenuation of the optical signal and an increase in the second attenuation of the scattered optical signal indicate a false reading.

14. The method of claim 11, wherein the liquid flow comprises a natural gas liquid.

15. The method of claim 11, wherein sending an optical signal comprises sending a continuous optical signal.

16. The method of claim 11, wherein detecting the optical signal and the scattered optical signal comprises averaging the detected signals over a specified period of time.

17. The method of claim 16, wherein the specified period of time is greater than four seconds.

18. The method of claim 11, wherein the optical signal comprises a visible wavelength of light.

19. The method of claim 11, wherein the angle of the second detector is substantially 90° from the first detector.

20. The method of claim 11, wherein the optical signal source comprises a laser and the optical signal comprises a laser beam.

21. The method of claim 11, further comprising directing the liquid flow to a filtering system in response to determining the contamination level exceeds a pre-determined threshold.

22. A black powder detector system comprising;
a flow cell attached to a flow-line, the flow cell configured to receive a side-stream from the flow-line for analysis, the flow cell being separate from the flow-line, the flow cell comprising:
   a flow inlet fluidically connecting the flow cell to the flow-line; and
   a flow outlet fluidically connecting the flow cell to the flow-line;
an optical signal source positioned at a first side of the flow cell, the optical signal source configured to emit an optical signal into the flow cell;
a first optical detector positioned at a second side of the flow cell opposite of the first side, the optical detector configured to detect an intensity of the optical signal;
a second optical detector positioned at a third side of the flow cell perpendicular to the first side and the second side, the second optical detector configured to detect a scatter intensity of the optical signal;
a pinhole configured to condition a first optical signal, the pinhole connecting the flow cell to the first optical detector; and
a lens configured to condition a scattered optical signal, the lens connecting the flow cell to the second optical detector.

23. The black powder detector system of claim 22, wherein a fluid in the flow-line comprises natural gas liquids.

24. The black powder detector system of claim 22, wherein the optical signal source comprises a collimated laser emitting laser beam with a frequency in a range from 400 nm to 600 nm.

25. A black powder detector comprising one or more processors configured to:
   determine whether detected changes to a black-powder concentration occur based on changes to a transmitted-light intensity; and
   verify whether the detected changes are correct based on comparing the changes in the transmitted-light intensity to changes in a scattered-light intensity.

26. The black powder detector of claim 25, wherein verifying whether the detected changes are correct comprises:
   determining the transmitted-light intensity and the scattered-light intensity as a function of time; and
   comparing changes in the transmitted-light intensity in a time period with changes in the scattered-light intensity in the time period.

27. The black powder detector of claim 26, wherein verifying whether the detected changes are correct comprises:
   determining the changes in the transmitted-light intensity and the scattered-light intensity both increase or decrease; and
   in response to the changes both increasing or decreasing, determining the detected changes in the black-powder concentration is a false positive.

* * * * *

UNITED STATES PATENT AND TRADEMARK OFFICE
CERTIFICATE OF CORRECTION

| | | |
|---|---|---|
| PATENT NO. | : 11,187,661 B2 | Page 1 of 1 |
| APPLICATION NO. | : 15/642039 | |
| DATED | : November 30, 2021 | |
| INVENTOR(S) | : Cunningham et al. | |

It is certified that error appears in the above-identified patent and that said Letters Patent is hereby corrected as shown below:

On the Title Page

OTHER PUBLICATIONS, Line 1, delete "Staptial" and insert -- Spatial --.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*